(12) United States Patent
Wang et al.

(10) Patent No.: US 10,737,700 B2
(45) Date of Patent: Aug. 11, 2020

(54) HYBRID/ELECTRIC VEHICLE MOTOR CONTROL DURING STEP-RATIO TRANSMISSION ENGAGEMENT

(71) Applicant: FORD GLOBAL TECHNOLOGIES, LLC, Dearborn, MI (US)

(72) Inventors: Xiaoyong Wang, Novi, MI (US); Rajit Johri, Canton, MI (US); Mark Steven Yamazaki, Canton, MI (US); Jeffrey Allen Doering, Canton, MI (US); Ming Lang Kuang, Canton, MI (US); Wei Liang, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 23 days.

(21) Appl. No.: 16/252,208

(22) Filed: Jan. 18, 2019

(65) Prior Publication Data

US 2019/0168765 A1    Jun. 6, 2019

Related U.S. Application Data

(62) Division of application No. 14/694,267, filed on Apr. 23, 2015, now Pat. No. 10,183,674.

(51) Int. Cl.
*B60W 30/19* (2012.01)
*B60W 10/08* (2006.01)
(Continued)

(52) U.S. Cl.
CPC ............... *B60W 30/19* (2013.01); *B60K 6/36* (2013.01); *B60K 6/387* (2013.01); *B60K 6/48* (2013.01);
(Continued)

(58) Field of Classification Search
None
See application file for complete search history.

(56) References Cited

U.S. PATENT DOCUMENTS

| 5,944,632 A | 8/1999 | Hara et al. |
| 6,110,072 A | 8/2000 | Harada et al. |
| (Continued) | | |

FOREIGN PATENT DOCUMENTS

CN        102490723 A    6/2012

OTHER PUBLICATIONS

Chinese Office Action dated Oct. 16, 2019, for related Chinese Patent No. CN201610261865.2; 6 Pages.

*Primary Examiner* — Dirk Wright
(74) *Attorney, Agent, or Firm* — Brooks Kushman PC; David Kelley

(57) ABSTRACT

A vehicle includes a step-ratio automatic transmission having clutches engageable to provide forward and reverse gears, an electric machine selectively coupled to the transmission, a main pump powered by the electric machine and supplying oil to actuate selected transmission clutches, a gear selector configured for selecting a transmission gear, and a controller configured to stop the electric machine when the gear selector selects park or neutral, to operate the electric machine in a speed control mode using a higher controller gain in response to the gear selector selecting forward or reverse while the electric machine is stopped until the electric machine and the main pump reach a first speed threshold to reduce engagement delay of at least one of the transmission clutches, and to operate the electric machine using a lower controller gain when the electric machine and the main pump exceed the first speed threshold.

18 Claims, 2 Drawing Sheets

(51) Int. Cl.
    B60W 10/30      (2006.01)
    B60W 20/00      (2016.01)
    B60K 6/36       (2007.10)
    B60K 6/387      (2007.10)
    B60K 6/547      (2007.10)
    B60K 6/48       (2007.10)
    F16H 61/00      (2006.01)
    F16H 61/04      (2006.01)

(52) U.S. Cl.
    CPC ............. *B60K 6/547* (2013.01); *B60W 10/08* (2013.01); *B60W 10/30* (2013.01); *B60W 20/00* (2013.01); *F16H 61/0031* (2013.01); B60K 2006/4825 (2013.01); B60W 2510/081 (2013.01); B60W 2540/10 (2013.01); B60W 2540/12 (2013.01); B60W 2540/16 (2013.01); B60W 2710/081 (2013.01); B60W 2710/082 (2013.01); B60W 2710/083 (2013.01); B60W 2710/1077 (2013.01); B60Y 2200/91 (2013.01); B60Y 2200/92 (2013.01); B60Y 2300/42 (2013.01); B60Y 2300/60 (2013.01); B60Y 2400/42 (2013.01); F16H 2061/0488 (2013.01); Y02T 10/6221 (2013.01); Y02T 10/6252 (2013.01); Y10S 903/909 (2013.01); Y10S 903/914 (2013.01); Y10S 903/93 (2013.01)

(56) References Cited

U.S. PATENT DOCUMENTS

| | | | |
|---|---|---|---|
| 7,510,500 B2 | 3/2009 | Antony et al. | |
| 8,062,171 B2 | 11/2011 | Soliman | |
| 8,494,730 B2 * | 7/2013 | Yoshikawa | B60W 10/08 701/51 |
| 8,543,274 B2 * | 9/2013 | Ikegami | B60K 6/48 701/22 |
| 8,544,577 B2 | 10/2013 | Kitano et al. | |
| 8,954,215 B2 | 2/2015 | Yamazaki et al. | |
| 9,096,208 B2 * | 8/2015 | Nefcy | B60W 10/08 |
| 9,139,191 B2 * | 9/2015 | Kang | F16H 61/0031 |
| 9,227,628 B1 * | 1/2016 | Liang | B60W 10/06 |
| 9,353,692 B2 * | 5/2016 | Hideg | F02D 28/00 |
| 9,827,978 B2 * | 11/2017 | McCullough | B60K 6/547 |
| 10,183,674 B2 * | 1/2019 | Wang | B60W 30/19 |
| 2003/0171867 A1 | 9/2003 | Nakamori et al. | |
| 2004/0063533 A1 | 4/2004 | Silveri et al. | |
| 2012/0265382 A1 | 10/2012 | Nefcy et al. | |
| 2013/0297162 A1 | 11/2013 | Dai et al. | |
| 2016/0229393 A1 | 8/2016 | McCullough et al. | |

* cited by examiner

HYBRID/ELECTRIC VEHICLE MOTOR CONTROL DURING STEP-RATIO TRANSMISSION ENGAGEMENT

CROSS-REFERENCE TO RELATED APPLICATIONS

This application is a division of U.S. application Ser. No. 14/694,267 filed Apr. 23, 2015, the disclosure of which is hereby incorporated in its entirety by reference herein.

TECHNICAL FIELD

The present disclosure relates to control of a hybrid or electric vehicle having an electric machine coupled to a step-ratio transmission during engagement of the transmission from Park or Neutral.

BACKGROUND

In various types of hybrid and electric powertrain configurations having an electric motor/generator coupled to an automatic step-ratio transmission, the motor may be stopped when the transmission is in Park or Neutral to conserve energy. When the motor is stopped, the torque converter impeller and the transmission main oil pump, which are driven by the motor, also stop. When the driver moves the gear selector from Park or Neutral to Drive or Reverse, one or more clutches are engaged to place the transmission in an appropriate forward or reverse gear to provide torque to the vehicle wheels and propel the vehicle. However, without the transmission main oil pump operating, the line pressure provided by any auxiliary oil pump may not be sufficient to quickly engage the shifting clutches. As a result, the wheel torque delivery may be delayed. Any significant delay may be particularly problematic if the driver moves the gear selector into Drive or Reverse while simultaneously pressing on the accelerator pedal.

SUMMARY

In various embodiments, a vehicle includes a step-ratio automatic transmission having a plurality of hydraulically actuatable clutches selectively engageable to provide at least one forward gear and at least one reverse gear, an electric machine selectively coupled to the transmission, a main pump powered by the electric machine and supplying oil to actuate selected ones of the plurality of hydraulically actuatable transmission clutches, a gear selector configured for selecting one of a park, neutral, forward, and reverse state for the automatic transmission, and a controller. The controller is configured to stop the electric machine when the gear selector selects park or neutral, to operate the electric machine in a speed control mode using a higher controller gain in response to the gear selector selecting forward or reverse while the electric machine is stopped until the electric machine and the main pump reach a first speed threshold to reduce engagement delay of at least one of the hydraulically actuatable transmission clutches, and to operate the electric machine using a lower controller gain when the electric machine and the main pump exceed the first speed threshold. The vehicle may also include a battery and an electric auxiliary pump connected to the battery to supply pressurized oil to the transmission. The controller may be configured to stop the electric machine and operate the electric auxiliary pump in response to detecting a brake pedal being depressed after the electric machine and the main pump reach the first speed threshold with the gear selector selecting forward or reverse. The controller may be further configured to, in response to depression of an accelerator pedal after the electric machine and the main pump reach the first speed threshold, operate the electric machine in torque control mode to deliver demanded torque to vehicle wheels. The controller may be further configured to operate the electric machine in a speed control mode using the lower controller gain in response to a brake pedal and an accelerator pedal being in a released position (not depressed) to deliver creep torque to vehicle wheels after the electric machine and the main pump reach the first speed threshold.

In one embodiment, the vehicle includes an electric auxiliary pump operable to supply oil to the transmission and the controller is further configured to operate the electric auxiliary pump until the electric machine and the main pump reach a second speed threshold, the second speed threshold being higher than the first speed threshold.

Embodiments also include a vehicle having an electric machine coupled to an engine and a step-ratio automatic transmission by upstream and downstream clutches, respectively, and a controller configured to stop the electric machine when the transmission is in park or neutral and, in response to selection of a driving gear, command a higher electric machine current until the electric machine attains a first speed, and a lower electric machine current thereafter to reduce transmission clutch engagement delay. The vehicle may include a main transmission pump driven by the electric machine and an electric auxiliary transmission pump.

In various embodiments, a vehicle may include a controller configured to operate the electric auxiliary pump in response to the selection of the driving gear until the electric machine attains a second speed higher than the first speed. The controller may be configured to operate the electric oil pump in response to the selection of the driving gear, and to stop the electric machine after the electric machine attains the first speed in response to depression of a brake pedal while maintaining operation of the electric oil pump. The controller may operate the electric machine in a speed control mode using a higher control system gain until the electric machine attains the first speed, and a lower control system gain after the electric machine attains the first speed. The controller may operate the electric machine in a torque control mode after the electric machine attains the first speed in response to an accelerator pedal signal. In some embodiments, the controller is further configured to operate the electric machine in the speed control mode using the lower control system gain in response to an accelerator pedal not being depressed after the electric machine attains the first speed to provide creep torque to vehicle wheels. The controller may be further configured to stop the electric machine in response to depression of a brake pedal while the driving gear is selected and the electric machine has attained the first speed.

Embodiments also include a method for controlling a hybrid vehicle having an electric machine coupled to an engine and a hydraulically actuated automatic transmission. The method may include, in response to a controller receiving a signal indicating a gear selector change from a non-driving to a driving state, controlling the electric machine to accelerate a transmission pump rotational speed at a higher rate until the pump reaches a first speed, and a lower rate thereafter to reduce transmission engagement delay. In one embodiment, the method includes the controller stopping the electric machine after the transmission pump speed reaches the first speed in response to depression of a brake pedal. The method may also include the controller operating an electric transmission pump in response to receiving the signal until the pump reaches a second speed higher than the first speed. In various embodiments, the method includes the controller applying a higher control system gain until the transmission pump reaches the first speed and a lower control system gain after the transmission pump reaches the first speed. The method may also include the controller changing operation of the motor from a speed control mode to operation in a torque control mode in response to a signal from an accelerator pedal. In some embodiments, the method includes the controller operating the motor in speed control mode to provide creep torque to vehicle wheels in response to the signal from the accelerator pedal indicating the accelerator pedal is not depressed.

Representative embodiments may have one or more associated advantages. For example, vehicle control according to various embodiments significantly reduces the automatic transmission gear engagement delay during transitions between park/neutral to a driving gear after the motor has been stopped such that the wheel torque delivery is fast and intuitive to the driver. Various embodiments leverage the characteristics of associated powertrain configurations to reduce engagement delay without introducing any objectionable torque disturbance to the vehicle wheels. Because the motor control operates when the driver moves the gear selector or shifter before the forward or reverse clutches are engaged, the driver line is open and no torque will be transmitted to the wheels from the powertrain. Furthermore, the torque converter does not transmit torque when the impeller (motor) speed is below a certain speed, such as about 350 rpm, for example, even if the transmission clutches are engaging. In addition, in various representative embodiments when the motor is spinning around about 300 to about 350 rpm, for example, the pressure generated by the main oil pump is sufficient to engage the transmission clutches. As such, the present disclosure recognizes that there exists a window where the motor can be operated aggressively using higher control system gain(s) to quickly accelerate and spin up to a corresponding engagement speed threshold without introducing any disturbance to the wheels to more quickly engage the associated transmission clutches and reduce delay between gear selector movement and torque delivery to the wheels.

The above advantages and other advantages and features associated with various embodiments will be readily apparent to those of ordinary skill in the art from the following detailed description of when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
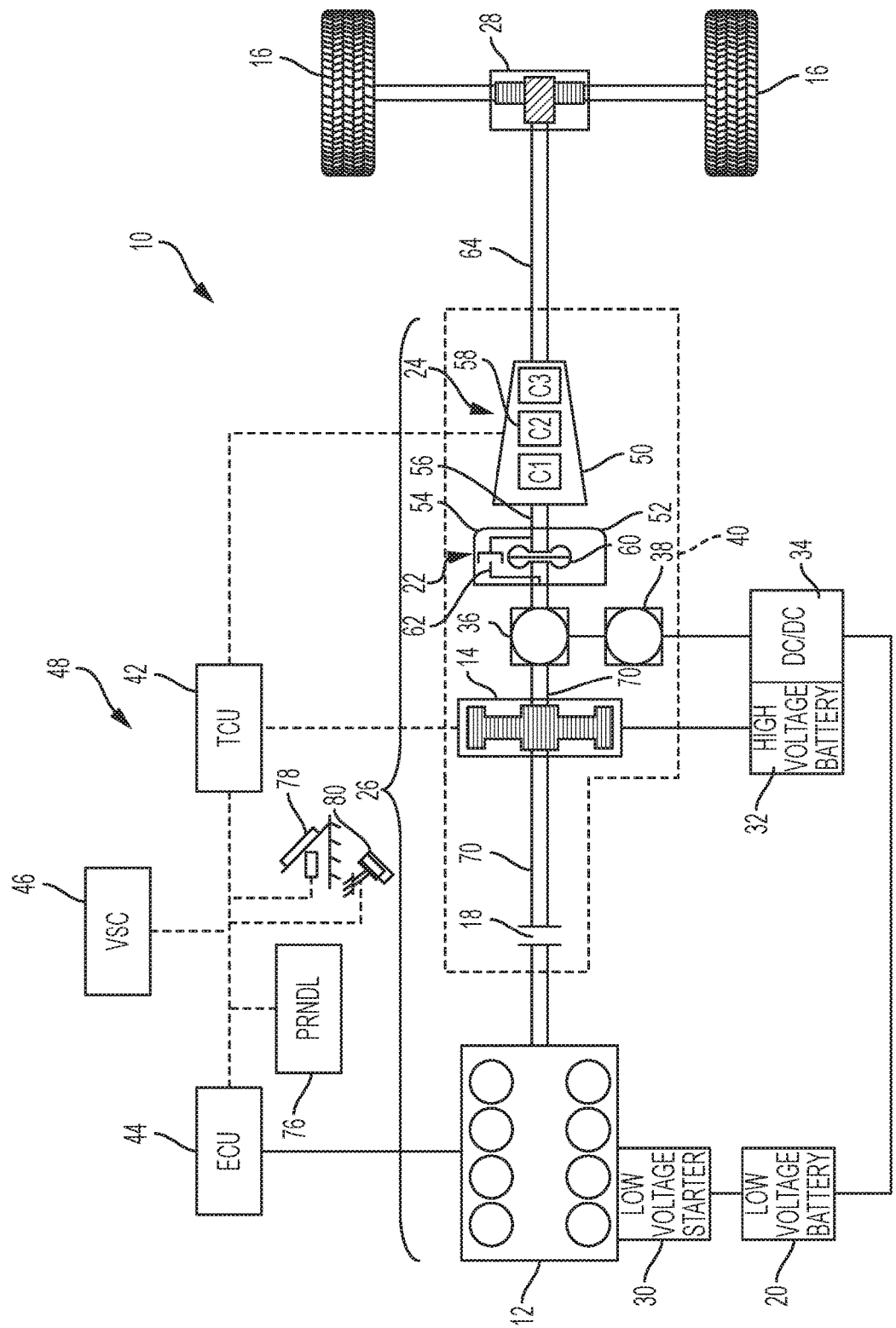
FIG. 1 is a block diagram illustrating operation of a system or method for controlling a vehicle having an electric machine during gear engagement of an automatic transmission according to representative embodiments of the disclosure.

FIG. 1 illustrates a schematic diagram of a hybrid vehicle 10 according to an embodiment. While the representative embodiment illustrated is a hybrid vehicle, those of ordinary skill in the art will recognize that present disclosure may be used to advantage in various other types of vehicles, such as an electric vehicle or a plug-in hybrid electric vehicle, for example. Similarly, the disclosure is not limited to the particular powertrain or driveline configuration illustrated and described with respect to FIG. 1 and various features described herein may be applied to other hybrid and electric vehicle configurations. In the representative embodiment illustrated, vehicle 10 includes an engine 12, and an electric machine implemented as a motor/generator (M/G) 14 which functions as both a motor and generator depending on the particularly operating mode. In some embodiments the electric machine may be implemented by a traction motor with a separate generator to generate electric power. Similarly, while a single M/G 14 is illustrated in the representative embodiment, various vehicle configurations may include more than one electric machine or motor/generator. M/G 14 is configured to transfer torque to the engine 12 or to the vehicle wheels 16.

In the representative embodiment of FIG. 1, M/G 14 is selectively coupled or connected to engine 12 using a first clutch 18, also known as a disconnect clutch or an upstream clutch. Clutch 18 may include a damper mechanism such as a series of plates and springs configured to help dampen changes in torque transferred between engine 12 and M/G 14 when disconnect clutch 18 is being engaged. An output shaft of engine 12 is connected to disconnect clutch 18, which in turn is connected to the input shaft 70 of M/G 14. In the representative embodiment illustrated, input shaft 70 extends through M/G 14, although other configurations are possible with M/G 14 having separate input and output shafts depending on the particular implementation.

A second clutch 22, also known as a launch clutch or a downstream clutch, connects M/G 14 to a transmission 24, and the input torque to the transmission 24 flows through the launch clutch 22 when engaged. The launch clutch 22 may be controlled to isolate the driveline 26, which includes M/G 14 and engine 12, from the transmission 24, differential 28 and vehicle drive wheels 16. Although the clutches 18, 22 are described and illustrated as hydraulic clutches, other types of clutches, such as electromechanical clutches may also be used. In the representative embodiment illustrated, downstream clutch 22 is implemented within a torque converter 52 as a bypass clutch 62 that may provide a mechanical coupling that bypasses the hydraulic coupling provided by the impeller 60 and turbine 54 when torque converter 52 rotates. In different embodiments, the downstream, launch, or second clutch 22 may refer to various coupling devices for the vehicle 10 including a traditional clutch or a torque converter having a bypass (lock-out) clutch as illustrated.

As previously described, in some embodiments, downstream clutch 22 is implemented by a torque converter 52 with a bypass clutch 62. In these embodiments, the input/output shaft 70 from M/G 14 drives impeller 60 of torque converter 52 which fluidly couples with turbine 54, which is coupled to a transmission input shaft 56 of automatic step-ratio transmission 24. The torque converter 52 can transfer torque using this fluid coupling, and torque multiplication may occur depending on the rotational speed differential between impeller 60 and turbine 54. The bypass or lock-up clutch 62 of torque converter 52 may be selectively engaged to create a mechanical connection between the impeller side and the turbine side for direct torque transfer. Bypass clutch 62 may be slipped and/or opened to control the amount of torque transferred through the downstream clutch device 22.

In some embodiments, engine 12 is a direct injection internal combustion engine. Various other types of engines or prime movers may be used, such as a port injection engine with one or more fuel sources, such as diesel, biofuel, natural gas, hydrogen, or the like. Similarly, other prime movers may be used to power the vehicle, such as a hydrogen fuel cell, for example. Engine 12 may be started using M/G 14 to rotate the engine using torque provided through clutch 18. Alternatively, vehicle 10 may include an electric starter motor 30 operatively connected to engine 12, for example, through a belt or gear drive. Starter motor 30 may be used to provide torque to start engine 12 without the addition of torque from M/G 14. This isolates M/G 14 during engine start and may eliminate or reduce torque disturbances that would otherwise occur from torque transferred from M/G 14 to engine 12 to assist engine starting.

As illustrated in the representative embodiment of FIG. 1, M/G 14 is in communication with a battery 32, which may be a high voltage battery. M/G 14 may be configured to charge the battery 32 in various operating modes when power output exceeds driver demand, which may include operating engine 12 at a more efficient operating point or steady operating point that exceeds current torque demand, regenerative braking, or the like. In one example, battery 32 is configured to connect to an external electric grid, such as for a plug-in hybrid electric vehicle (PHEV) with the capability to recharge the battery from the power grid using an on-board charger and electrical vehicle supply equipment (EVSE) (not specifically illustrated) coupled to an electrical outlet at a charging station. A low voltage battery 20 may also be provided to power starter motor 30 or other vehicle components, and may be connected to battery 32 by a DC/DC converter 34.

As previously described, transmission 24 is an automatic step-ratio transmission connected to drive wheels 16 in a conventional manner, which may include a differential 28. Vehicle 10 may include non-driven wheels, or may include a transfer case and a second differential to positively drive all of the vehicle wheels.

Transmission 24 has a gearbox 50 to provide various selectable gear ratios that may include one or more forward gear ratios and one or more reverse gear ratios in addition to a park and neutral gear state for vehicle 10. Transmission gearbox 50 may include hydraulically actuatable clutches C1, C2, C3, generally indicated by reference numeral 58, that cooperate with one or more planetary gearsets (not shown) to provide a predetermined number of forward and reverse discrete gears or gear ratios. Forward gear ratios may be automatically selected based on associated vehicle and ambient operating conditions by an associated controller or manually selected by an operator using a PRNDL or gear selector 76 as described in greater detail below. Forward and reverse gear ratios may collectively be referred to as driving gears, states, or gear ratios as compared to a neutral or park state, which states may be collectively referred to as non-driving states or gears. Similarly, forward gear ratios may also be collectively referred to as the transmission or gear selector being in drive.

Pressurized fluid for the transmission is provided by a main transmission pump 36. The main transmission pump 36 is connected to or adjacent to M/G 14 such that it rotates with input/output shaft 70 of M/G 14 to supply pressurized transmission fluid or oil to transmission 24. When the portion of driveline 26 containing main transmission pump 36 is at rest, e.g. when electric machine or M/G 14 is stopped and not rotating, main pump 36 is also at rest and is inactive. As described in greater detail below, M/G 14 may be operated more aggressively in a speed control mode using a higher control system gain to provide a higher current and associated acceleration to M/G 14 in response to gear selector 76 changing from a park or neutral (P/N) position to a forward or reverse (or driving) position until M/G speed and corresponding speed of main pump 36 reach an associated first threshold to provide pressurized oil or fluid to actuate clutches 58 of transmission 24 to reduce engagement delay. Once the engagement speed threshold is attained or reached, M/G 14 may be operated less aggressively using a lower control system gain and associated lower current and acceleration.

To provide pressurized transmission fluid when main pump 36 is inactive, vehicle 10 may include an auxiliary pump 38, which may be electrically powered, for example by battery 32 through DC/DC converter 34. In some embodiments, auxiliary pump 38 provides a portion of the transmission fluid for the transmission 24 such that the transmission 24 is limited in operation, for example to certain actuators or gearing ratios, when only the auxiliary pump 38 is operating. As described in greater detail below, auxiliary pump 38 may be operated in combination with main pump 36 to further reduce engagement delay of one or more transmission clutches 58 under various operating conditions. Similarly, auxiliary pump 38 may be operated to maintain engagement of one or more transmission clutches 58 as main pump 36 decelerates and stops.

As generally illustrated in FIG. 1, M/G 14, the clutches 18, 22, 58, main transmission pump 36 and auxiliary transmission pump 38 may be located at least partially within a motor generator case 40, which may be integrated with the transmission case, or alternatively, is a separate case within vehicle 10. As such, pressurized fluid provided by main pump 36 and/or auxiliary pump 38 may also be used to actuate clutch 18 and provide cooling and lubrication of M/G 14.

Although the operation of various clutches, such as clutches 18, 22 may be described with respect to pressure or pressurized fluid or oil implying a hydraulic clutch, other types of devices, such as electromechanical clutches or torque converters may also be used. In the case of hydraulic clutches, the pressure on the clutch plates is related to torque capacity. In the same way, the forces acting on the plates in a non-hydraulic clutch are also related to torque capacity. When clutches 18 and/or 22 are locked or engaged, the rotational speeds of the driveline components on either side of the clutch are the same. A speed difference from one side of a clutch to the other may occur when the clutch is partially applied or slipping. When the downstream clutch 22 is a bypass clutch for a torque converter, it may be considered to be slipping when it is fully open since there is a speed differential across the clutch, even when no torque is being transferred through the bypass clutch.

Automatic step-ratio transmission 24 may be controlled using a transmission control unit (TCU) 42 to operate according to a shift schedule, such as a production shift schedule, that actuates clutches 58 and various other elements within the gear box to control the ratio between the transmission input shaft 56 and output shaft 64. TCU 42 may change the shift schedule or transmission 24 operation when the main pump 36 or the auxiliary pump 38 is operational as generally described with reference to FIG. 2. TCU 42 also acts to control M/G 14, clutches 18, 22, and any other components within the motor generator case 40.

An engine control unit (ECU) 44 is configured to control operation of engine 12. A vehicle system controller (VSC) 46 transfers data between TCU 42 and ECU 44 and is also in communication with various vehicle sensors and driver inputs, including gear selector (PRNDL) 76, accelerator pedal 78, and brake pedal 80. The control system 48 for vehicle 10 may include any number of controllers, and may be integrated into a single controller, or have various modules. Some or all of the controllers may be connected by a controller area network (CAN) or other system. The control system 48 may be generally referred to as a controller and configured to control operation of the various components of transmission 24, electric machine or M/G 14, starter motor 30, and engine 12 under any of a number of different conditions. As described in greater detail with reference to FIG. 2, controller or control system 48 may stop M/G 14 when gear selector 76 is in a park or neutral (P/N) position or state. Similarly, control system 48 may apply a higher control system gain or gains and operate M/G 14 in a speed control mode to more quickly or aggressively accelerate M/G 14 and associated main pump 36 by applying a higher current from battery 32 in response to gear selector 76 changing from P/N or a non-driving state, to a driving state, such as R, D, or L until the rotational speed of M/G 14 reaches a first threshold, while applying a lower control system gain and associated current to M/G 14 thereafter.

VSC 46 interprets the driver demand (e.g. wheel torque demand) based on signals from PRNDL 76, accelerator pedal 78 and brake pedal 80, for example, and then determines appropriate operating modes, such as a speed control mode or torque control mode for engine 12 and M/G 14, and selects an appropriate gear or transmission state to deliver an associated wheel torque to vehicle wheels 16. In addition, VSC 46 may determine how much torque each power source needs to provide to meet the wheel torque requested by the driver and meet any accessory demand. Control logic implemented in hardware and/or software may include an algorithm, program, or configuration within the control system 48 that controls operation of M/G 14 and transmission 24 as generally represented by the flowchart of FIG. 2 to reduce transmission or clutch engagement delay when gear selector 76 is moved or changes from P/N to a forward or reverse gear while M/G 14 and main transmission pump 36 are stopped.

Figure 2:
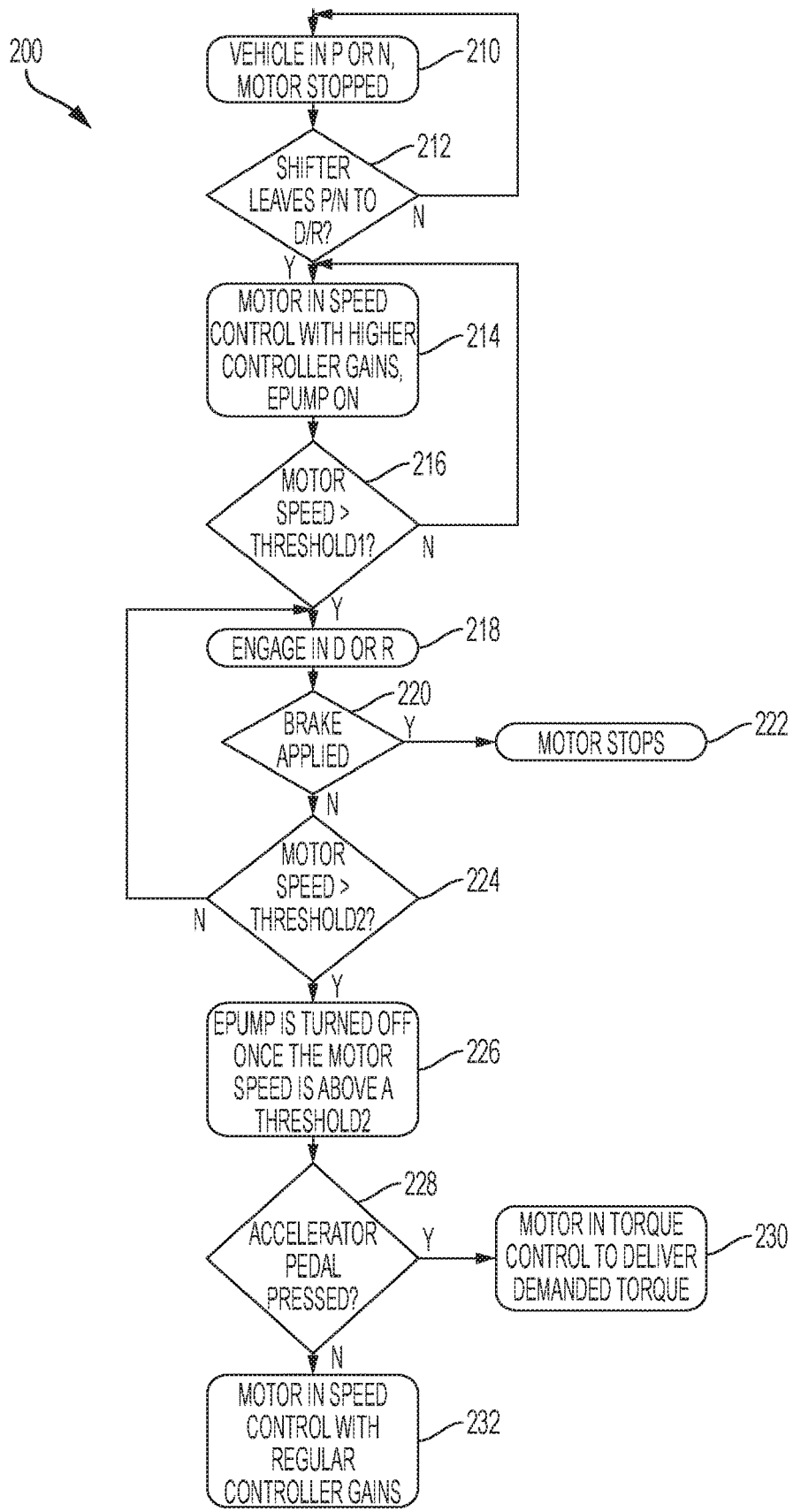
FIG. 2 is a flowchart illustrating operation of a system or method for controlling a vehicle having an electric machine according to various representative embodiments of the disclosure.

As illustrated in the representative embodiment of FIG. 1, and described in greater detail with respect to the flowchart of FIG. 2, a vehicle 10 includes a step-ratio automatic transmission 24 having a plurality of hydraulically actuatable clutches 58 selectively engageable to provide at least one forward gear and at least one reverse gear. Vehicle 10 may include an electric machine 14 selectively coupled to transmission 24 by a downstream clutch 22 and/or torque converter 52. A main pump 36 powered by electric machine 14 supplies oil to actuate selected ones of the plurality of hydraulically actuatable transmission clutches 58. A gear selector 76 configured for selecting one of a park, neutral, forward, and reverse driving state for automatic transmission 24 is in communication with a controller, such as TCU 42, ECU 44, and/or VSC 46, collectively referred to as controller or control system 48, which is configured to stop electric machine 14 when gear selector 76 selects park or neutral. Controller or control system 48 operates electric machine 14 in a speed control mode using a higher controller gain in response to gear selector 76 selecting forward or reverse while electric machine 14 is stopped until electric machine 14 and main pump 36 reach a first speed threshold to reduce engagement delay of at least one of the hydraulically actuable transmission clutches 58. Controller or control system 48 thereafter operates electric machine 14 using a lower controller or control system gain when electric machine 14 and main pump 36 exceed the first speed threshold.

In one embodiment, vehicle 10 includes an electric machine 14 coupled to an engine 12 and a step-ratio automatic transmission 24 by upstream and downstream clutches 18, 22, respectively. A controller or control system 48 is configured to stop electric machine 14 when transmission 24 is in park or neutral as selected by gear selector 76. In response to selection of a driving gear, such as R, D, or L, for example, the controller or control system 48 commands a higher electric machine current from battery 32 and associated electronics until electric machine 14 attains a first speed, and a lower electric machine current thereafter to reduce transmission clutch engagement delay for one or more clutches 58 within gearbox 50 of transmission 24.

Referring now to FIG. 2, a flowchart illustrates operation of a system or method for controlling a vehicle to reduce automatic transmission engagement delay according to various embodiments of the present disclosure. Flowchart 200 generally illustrates control logic, functions, or features performed by hardware and/or software as part of control system 48 (FIG. 1). One or more controllers may include a processor, processing circuitry, or other control circuitry represented by the flowchart configured to perform or control the illustrated feature or function.

FIG. 2 illustrates a representative control strategy and/or logic for a system or method that may be implemented using one or more processing strategies such as event-driven, interrupt-driven, multi-tasking, multi-threading, and the like. As such, various steps or functions illustrated may be performed in the sequence illustrated, in parallel, in a different sequence, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described, but is provided for ease of illustration and description. The control logic may be implemented primarily in software executed by a microprocessor-based controller configured to perform the illustrated task or function. Of course, the control logic may be implemented in software, hardware, or a combination of software and hardware in one or more controllers or processors depending upon the particular application. When implemented in software, the control logic may be provided in one or more non-transitory computer-readable storage devices or media having stored data representing code or instructions executed by a processor or computer.

In various embodiments, the controller or control system may stop the electric machine or M/G 14 from rotating when the gear selector is in park or neutral (P/N) as generally represented by block 210 to conserve energy. Stated differently, the controller stops the electric machine when the transmission or vehicle is in park or neutral. When the transmission gear selector or gear state changes from P/N to a forward or reverse gear as represented by block 212, the controller operates the electrical machine in a speed control mode with higher controller gains as represented at 214. The controller may also operate the electric auxiliary transmission pump as represented by block 214. The higher control system gain results in a higher current being applied by the control system electronics powered by battery 32 and corresponding higher acceleration of the motor speed. The higher control system gain is applied until the motor speed (and corresponding main transmission pump speed) reaches or exceeds a corresponding speed threshold represented by block 216. The more aggressive control and resulting acceleration of the electric machine rotational speed facilitates a faster supply of pressurized fluid from the main pump 36 to engage the hydraulically actuatable transmission clutches for the selected transmission gear as represented at 218. Pressurized fluid is also supplied by operation of the electric auxiliary pump 38.

After the electric machine reaches the first speed threshold as represented at 216 and the transmission clutches are engaging or engaged as represented by block 218, the controller stops the electric machine in response to depression of the brake pedal as represented by blocks 220 and 222. In response to the electric machine reaching a second speed threshold higher than the first speed threshold as represented by block 224, and the brake pedal not being depressed as represented by block 220, the controller may turn off the electric auxiliary pump as represented at 226. The controller may operate the electric machine in a torque control mode to deliver demanded torque as represented at 230 in response to depression of an accelerator pedal as represented at 228. If neither the brake nor the accelerator pedal is depressed as represented by blocks 220 and 228, respectively, the controller may operate the electric machine in the speed control mode with a lower control system gain to provide creep torque to the vehicle wheels as represented at 232.

As generally illustrated in FIGS. 1 and 2, a method for controlling a hybrid vehicle 10 having an electric machine 14 coupled to an engine 12 and a hydraulically actuated automatic transmission 24 includes, in response to a controller 48 receiving a signal indicating a gear selector 76 change from a non-driving (P/N) to a driving state (forward, reverse, D, R, L, etc.), controlling the electric machine 14 to accelerate a transmission pump 36 rotational speed at a higher rate until the pump reaches a first speed (threshold1), and a lower rate thereafter to reduce transmission engagement delay. The method may include the controller stopping the electric machine 222 after the transmission pump speed reaches the first speed (threshold1) in response to depression of a brake pedal 220. The method may also include the controller or control system 48 operating an electric transmission pump 38 in response to receiving the signal from the gear selector 76 until the pump reaches a second speed (threshold2) higher than the first speed (threshold1).

In some embodiments, the method may include the controller or control system 48 applying a higher control system gain 214 to control the electric machine 14 until the transmission pump reaches the first speed (threshold1) and a lower control system gain 232 after the transmission pump 36 reaches the first speed (threshold1). The method may also include the controller or control system 48 changing operation of the electric machine motor from a speed control mode 214, 232 to operation in a torque control mode 230 in response to a signal from an accelerator pedal 228. The method may also include the controller or control system 48 operating the electric machine 14 in speed control mode to provide creep torque to vehicle wheels 232 in response to the signal from the accelerator pedal indicating the accelerator pedal 78 is not depressed 228.

As such, various embodiments according to the present disclosure significantly reduce the automatic transmission gear engagement delay during transitions between park/neutral to a driving gear after the electric machine or motor/generator has been stopped such that the wheel torque delivery is fast and intuitive to the driver. Various embodiments leverage the characteristics of associated powertrain configurations to reduce engagement delay without introducing any objectionable torque disturbance to the vehicle wheels. Because the more aggressive motor control operates when the driver moves the gear selector or shifter before the forward or reverse clutches are engaged, the driveline is open and no torque will be transmitted to the wheels from the powertrain. Furthermore, embodiments that include a torque converter do not transmit torque when the impeller (electric motor/machine) speed is below a certain speed threshold, such as about 350 rpm, for example, even if the transmission clutches are engaging. In addition, in various representative embodiments when the motor is spinning around about 300 to about 350 rpm, for example, the pressure generated by the main oil pump and/or auxiliary oil pump is sufficient to engage the transmission clutches. As such, representative embodiments of the present disclosure use the time window where the motor can be operated aggressively using higher control system gain(s) to quickly accelerate and spin up to a corresponding engagement speed threshold without introducing any disturbance to the wheels to more quickly engage the associated transmission clutches and reduce delay between gear selector movement and torque delivery to the wheels While exemplary embodiments are described above, it is not intended that these embodiments describe all possible forms of the claimed subject matter. Rather, the words used in the specification are words of description rather than limitation, and it is understood that various changes may be made without departing from the spirit and scope of the disclosure. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
an electric machine coupled to an engine and a step-ratio automatic transmission by upstream and downstream clutches, respectively; and
a controller configured to stop the electric machine when the transmission is in park or neutral and, in response to selection of a driving gear, command a higher electric machine current until the electric machine attains a first speed, and a lower electric machine current thereafter to reduce transmission clutch engagement delay.

2. The vehicle of claim 1 further comprising:
a main transmission pump driven by the electric machine; and
an electric auxiliary transmission pump, the controller further configured to operate the electric auxiliary transmission pump in response to the selection of the driving gear until the electric machine attains a second speed higher than the first speed.

3. The vehicle of claim 1 further comprising:
an electric oil pump, the controller further configured to operate the electric oil pump in response to the selection of the driving gear, and to stop the electric machine after the electric machine attains the first speed in response to depression of a brake pedal while maintaining operation of the electric oil pump.

4. The vehicle of claim 1, the controller operating the electric machine in a speed control mode using a higher control system gain until the electric machine attains the first speed, and a lower control system gain after the electric machine attains the first speed.

5. The vehicle of claim 4, the controller operating the electric machine in a torque control mode after the electric machine attains the first speed.

6. The vehicle of claim 4, the controller operating the electric machine in a torque control mode after the electric machine attains the first speed in response to depression of an accelerator pedal.

7. The vehicle of claim 4, the controller further configured to operate the electric machine in the speed control mode using the lower control system gain in response to an accelerator pedal not being depressed after the electric machine attains the first speed to provide creep torque to vehicle wheels.

8. The vehicle of claim 1, the controller further configured to stop the electric machine in response to depression of a brake pedal while the driving gear is selected and the electric machine has attained the first speed.

9. A method for controlling a hybrid vehicle having an electric machine coupled to an engine and a hydraulically actuated automatic transmission, comprising:
in response to a controller receiving a signal indicating a gear selector change from a non-driving to a driving state, controlling the electric machine to accelerate a transmission pump rotational speed at a higher rate until the pump reaches a first speed, and a lower rate thereafter to reduce transmission engagement delay.

10. The method of claim 9, the controller stopping the electric machine after the transmission pump speed reaches the first speed in response to depression of a brake pedal.

11. The method of claim 9, the controller operating an electric transmission pump in response to receiving the signal until the pump reaches a second speed higher than the first speed.

12. The method of claim 9, the controller applying a higher control system gain until the transmission pump reaches the first speed and a lower control system gain after the transmission pump reaches the first speed.

13. The method of claim 12, the controller changing operation of the electric machine from a speed control mode to operation in a torque control mode in response to a signal from an accelerator pedal.

14. The method of claim 13, the controller operating the electric machine in speed control mode to provide creep torque to vehicle wheels in response to the signal from the accelerator pedal indicating the accelerator pedal is not depressed.

15. A method for controlling a vehicle having a traction motor coupled to an engine and a hydraulically actuated automatic transmission, comprising:
in response to a controller receiving a signal indicating a gear selector change from a PARK or NEUTRAL to a forward or reverse gear:
controlling the traction motor to accelerate a transmission pump of the automatic transmission at a first rate until the transmission pump reaches a first speed, and a second rate, different from the first rate thereafter, to reduce engagement delay of the automatic transmission; and
stopping the traction motor after the transmission pump speed reaches the first speed in response to depression of a brake pedal.

16. The method of claim 15, wherein the controller is configured to apply a higher control system gain until the transmission pump reaches the first speed and a lower control system gain after the transmission pump reaches the first speed.

17. The method of claim 16, wherein the controller is configured to change operation of the traction motor from a speed control mode to operation in a torque control mode in response to a signal from an accelerator pedal.

18. The method of claim 17, wherein the controller is configured to operate the traction motor in speed control mode to provide creep torque to vehicle wheels in response to the signal from the accelerator pedal indicating the accelerator pedal is not depressed.

* * * * *